(12) United States Patent       (10) Patent No.:     US 9,580,139 B2
Hsu                             (45) Date of Patent:     Feb. 28, 2017

(54) ELECTRIC KICK SCOOTER

(71) Applicant: J.D Components Co., Ltd, Chang Hua Hsien (TW)

(72) Inventor: Yuan-Fang Hsu, Hsinchu (TW)

(73) Assignee: J.D COMPONENTS CO., LTD, Chang Hua Hsien (TW)

( * ) Notice: Subject to any disclaimer, the term of this patent is extended or adjusted under 35 U.S.C. 154(b) by 0 days.

(21) Appl. No.: 14/169,542

(22) Filed: Jan. 31, 2014

(65) Prior Publication Data

US 2014/0216837 A1    Aug. 7, 2014

(30) Foreign Application Priority Data

Feb. 1, 2013   (TW) .............................. 102104047 A

(51) Int. Cl.
  *A63C 17/12*   (2006.01)
  *B62M 6/40*    (2010.01)
  *B62K 3/00*    (2006.01)
  *B62K 23/00*   (2006.01)
  *B62M 6/50*    (2010.01)

(52) U.S. Cl.
  CPC .............. *B62M 6/40* (2013.01); *B62K 3/002* (2013.01); *B62K 23/00* (2013.01); *B62M 6/50* (2013.01)

(58) Field of Classification Search
  CPC . B62M 1/00; A63C 5/08; A63C 17/01; A63C 17/012; A63C 17/12
  USPC .......... 180/180, 220, 181, 221, 228, 87.021, 180/87.05, 87.042
  See application file for complete search history.

(56) References Cited

U.S. PATENT DOCUMENTS

| | | | | |
|---|---|---|---|---|
| 5,848,660 A * | 12/1998 | McGreen | ....................... | 180/220 |
| 5,894,898 A * | 4/1999 | Catto | ............................ | 180/181 |
| 6,227,324 B1 * | 5/2001 | Sauve | ............................ | 180/228 |
| 6,345,678 B1 * | 2/2002 | Chang | ............................ | 180/181 |
| 6,832,660 B2 * | 12/2004 | Dodd | ............................. | 180/220 |
| 7,040,443 B1 * | 5/2006 | Roth et al. | .................... | 180/221 |
| 7,562,738 B2 * | 7/2009 | Suyama | .................... | B60T 7/02 |
| | | | | 180/332 |
| 7,699,130 B2 * | 4/2010 | Palmer | .......................... | 180/180 |
| 2002/0000702 A1 * | 1/2002 | Charron | .................. | 280/87.021 |
| 2002/0108798 A1 * | 8/2002 | Huntsberger et al. | ........ | 180/220 |
| 2013/0201316 A1 * | 8/2013 | Binder et al. | .................... | 348/77 |

\* cited by examiner

*Primary Examiner* — Hau Phan
(74) *Attorney, Agent, or Firm* — Muncy, Geissler, Olds & Lowe, P.C.

(57) ABSTRACT

An electric kick scooter including a scooter body, a drive device and a strain gauge is provided. The scooter body has a foot plate, a steering tube and a rear wheel respectively provided at front and rear ends of the foot plate, and a handle bar and a front wheel respectively provided at top and bottom ends of the steering tube. The drive device has a motor installed in the front wheel or rear wheel, and a battery installed with the scooter body and electrically connected to the motor. The strain gauge is attached to the steering tube or handle bar of the scooter body to sense the strain generated on the steering tube or handle bar when it receives a force. The strain signal of the strain gauge is transmitted to a controller for enabling the controller to control an action of the motor accordingly.

7 Claims, 5 Drawing Sheets

ELECTRIC KICK SCOOTER

CROSS-REFERENCE TO RELATED APPLICATIONS

This application claims priority from Taiwan Patent Application No. 102104047 filed on Feb. 1, 2013, the entire content of which is incorporated herein by reference.

BACKGROUND OF THE INVENTION

1. Field of the Invention

The present invention relates to an electric kick scooter, and particularly to an electric kick scooter with the convenience of manipulation.

2. Description of the Related Art

A traditional kick scooter is propelled by a user stepping continuously on the ground with a single foot to achieve an effect of gliding forward. Nevertheless, when riding on an uphill path, in addition to the decrease of gliding speed of the kick scooter, the user would spend considerable physical strength to drive the kick scooter forward. So this will greatly reduce the user's interest to the kick scooter. Accordingly, to reduce the influence of uphill sections on the interest of user of kick scooters, there are currently so-called electric kick scooters on the market, providing appropriate electric power assistance in various road sections, so that users can more conveniently and easily manipulate the kick scooter.

At present, electric kick scooters are to achieve the effect of speed control by means of nothing more than turning a grip or stepping on a foot plate. However, whichever way of driving is used, certain coordination is needed in manipulation, and thus not every user can handle skillfully. Furthermore, once an emergency situation that deceleration braking is needed is encountered, the user often cannot appropriately react to the grip or food plate immediately, thereby imperceptibly increasing the risk in use.

SUMMARY OF THE INVENTION

The main object of the present invention is to provide an electric kick scooter, which facilitates users to control accelerating, decelerating and braking with well safety of manipulation.

To attain the above-mentioned object, the electric kick scooter provided by the present invention comprises a scooter body, a drive device, at least one strain gauge and a controller. The scooter body has a foot plate, a steering tube, a handle bar, a front wheel and a rear wheel. The steering tube is pivotally installed at a front end of the foot plate. The handle bar is installed at a top end of the steering tube. The front wheel is rotatably installed at a bottom end of the steering tube. The rear wheel is rotatably installed at a rear end of the foot plate. The drive device has a motor and a battery. The motor is installed in the front wheel or rear wheel of the scooter body. The battery is installed with the scooter body and electrically connected to the motor. The strain gauge is attached to the steering tube or handle bar of the scooter body to sense the strain generated on the steering tube or handle bar when the steering tube or handle bar receives a force and then generate and transmit a strain signal. The controller electrically connected to the motor, battery and strain gauge to receive the strain signal from the strain gauge and then control an action of the motor based on the strain signal thus received.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF EMBODIMENTS

Figure 1:
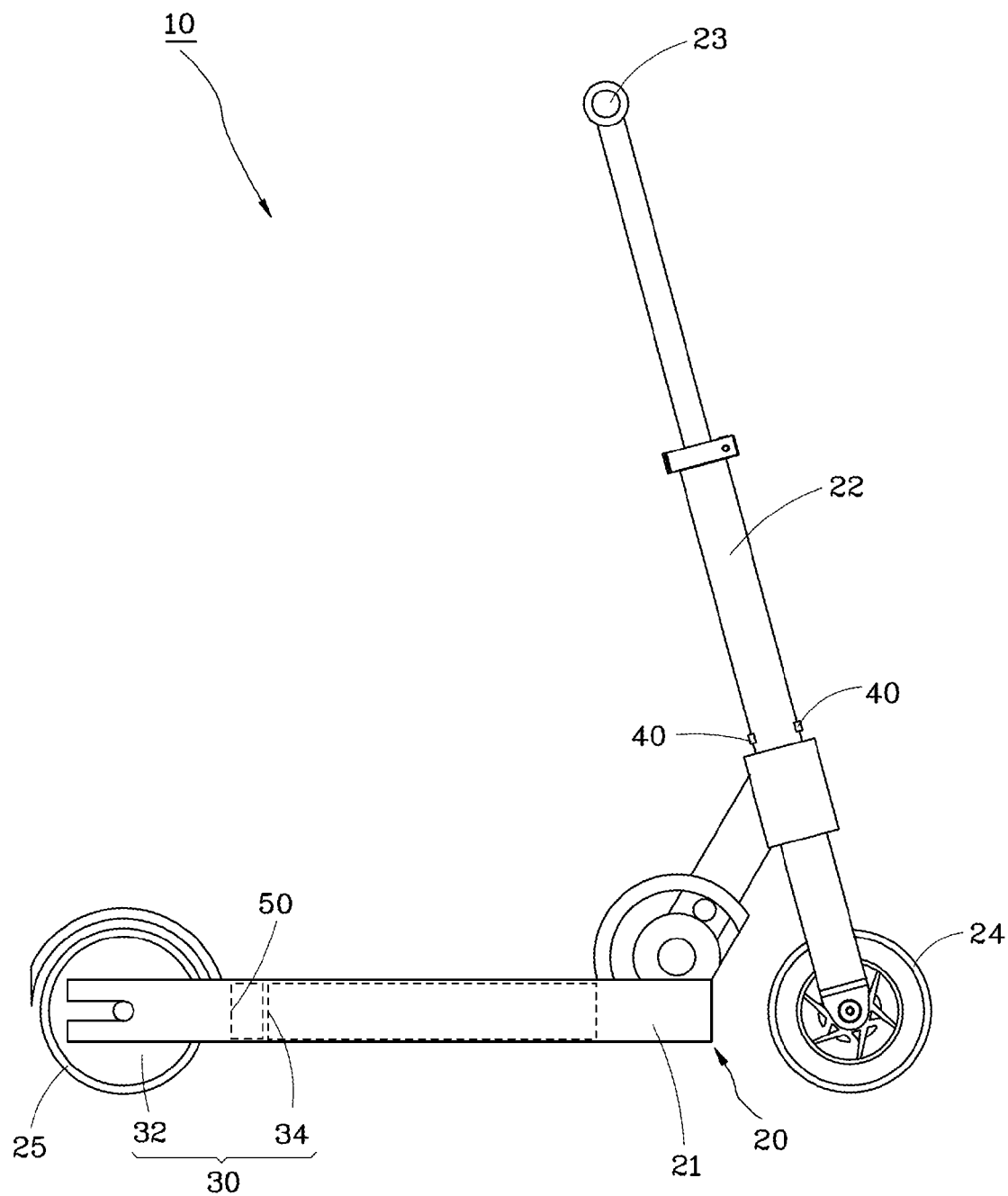
FIG. 1 is a lateral plan view of an electric kick scooter according to a first embodiment of the present invention.

First referring to FIG. 1, an electric kick scooter 10 of a first embodiment of the present invention comprises a scooter body 20, a drive device 30, two strain gauges 40 and a controller 50.

The scooter body 20 has a foot plate 21, a steering tube 22, a handle bar 23, a front wheel 24 and a rear wheel 25. The steering tube 22 is installed at a frond end of the foot plate 21, and the handle bar 23 is installed at a top end of the steering tube 22 for a user to grasp so as to manipulate turning left and right, pushing forward and pulling backward with respect to the steering tube 22, The front wheel 24 is rotatably installed at a bottom end of the steering tube 22, and the rear wheel 25 is rotatably installed at a rear end of the foot plate 21.

Figure 3:
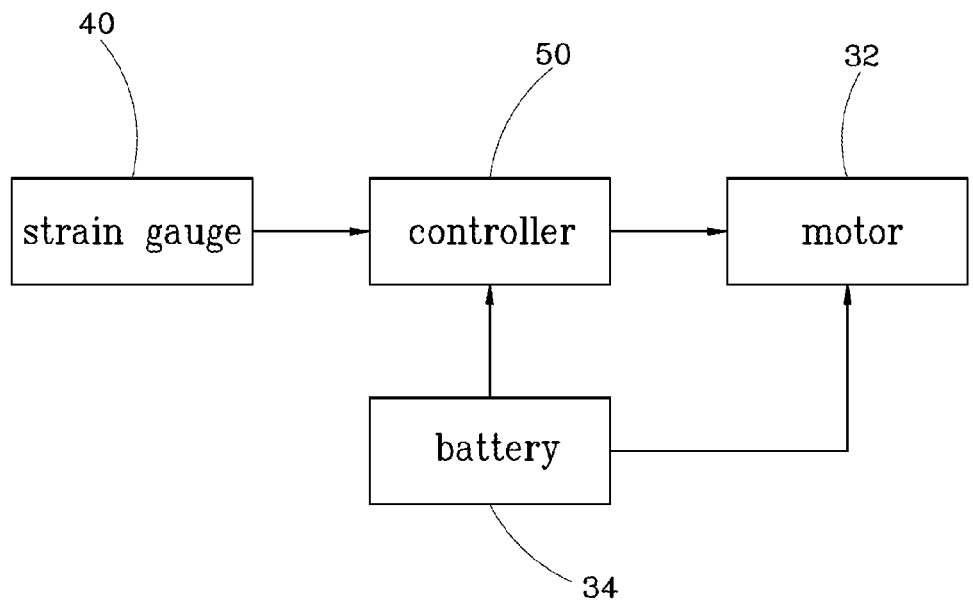
FIG. 3 is a block diagram showing the relationship of the elements of the electric kick scooter of the first embodiment of the present invention.

With reference to FIGS. 1 and 3, the drive device 30 has a motor 32 and a battery 34. The motor 32 may be installed in the front wheel 24 or rear wheel 25 of the scooter body 20. In this embodiment, the motor 32 is installed in the rear wheel 25. The battery 34 is electrically connected to the motor 32, and may be installed on the bottom of the foot plate 21 of the scooter body 20 or inside the foot plate 21 based on actual needs. In this embodiment, the battery 34 is installed inside the foot plate 21 for supplying electric power to the motor 32.

Figure 2:
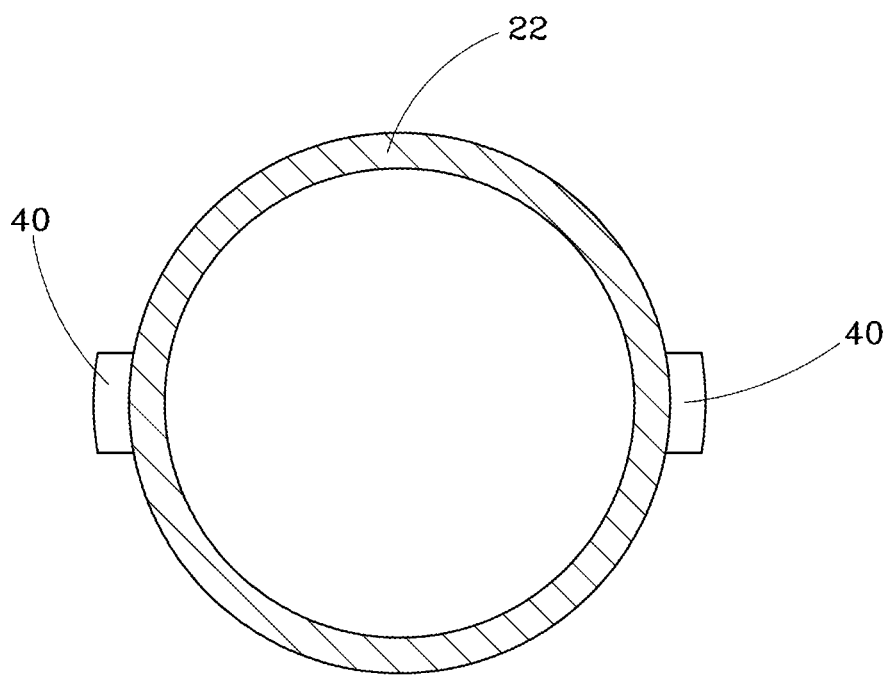
FIG. 2 is a crosssection view of a steering tube of the electric kick scooter of the first embodiment of the present invention.

With reference to FIG. 2, in this embodiment, two strain gauges 40 are respectively attached on front and rear sides of the steering tube 22 of the scooter body 20 along a direction consistent with the advancing direction of the scooter body 20, so as to sense the strain generated on the steering tube 22 when the steering tube 22 receives a force. Here, it needs to be complementarily mentioned that the strain gauges 40 can be installed at a top end of the steering tube 22, i.e. at a position near the handle bar 23, at the center of the steering tube 22, or at other positions of the steering tube 22. For providing the best effect of sensing, the attached positions as shown in FIG. 1 are optimally selected in his embodiment. In addition, the strain gauges 40 are not necessarily provided with two sets simultaneously. At least one strain gauge 40 that is installed at the front or rear side of the steering tube 22 shall be sufficient for achieving the object of the present invention.

The controller 50 is installed inside the foot plate 21 of the scooter body 20 and electrically connected with the motor 32, battery 34 and two strain gauges 40 to receive strain signals from the two strain gauges 40, so as to control the action of the motor 32, e.g. accelerating, decelerating, stopping operation or braking.

Figure 4:
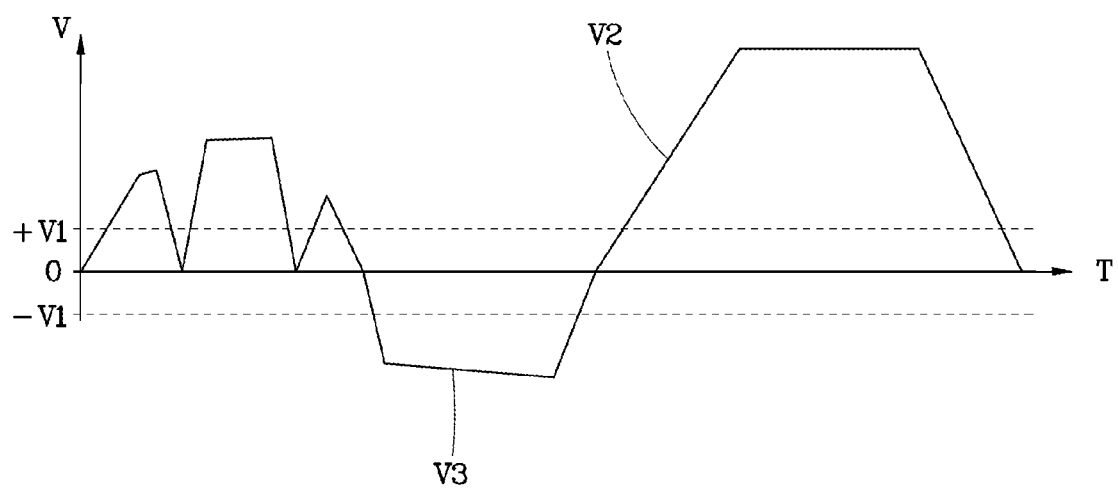
FIG. 4 is a diagram illustrating signal outputs of a strain gauge of the electric kick scooter of the first embodiment of the present invention.

FIG. 4 shows signal outputs of the strain gauge 40 of the electric kick scooter 10, wherein the axis of ordinate indicates the value of voltage V and the axis of abscissa indicates the time T. When the user applies a force of pushing forward to the steering tube 22, the two strain gauges 40 can sense the deformation of the steering tube 22 to generate and transmit a strain signal to the controller 50 respectively. Once a strain signal value V2 transmitted by each of the strain gauges is greater than a predetermined value +V1 built in the controller 50, the controller 50 will control the motor 32 to increase the power output to the rear wheel 25, so that the scooter body 20 starts accelerating, thereby avoiding a signal controlling the action of the motor 32 from being unexpectedly generated due to the influence of mistakenly touching the steering tube 22 by the user or receiving the road vibration. Therefore, the safety of use of the electric kick scooter 10 can he increased. Similarly, when the user applies a force of pulling backward to the steering tube 22, the two strain gauges 40 can sense the deformation of the steering tube 22, so as to generate and transmit another strain signal to the controller 50 respectively. Once a strain signal value V3 transmitted by each of the strain gauges 40 is less than another predetermined value −V1 built in the controller 50, the controller 50 will control the motor 32 to decrease the power output to the rear wheel 25, so that the scooter body 20 starts decelerating.

Besides, when the controller 50 receives a strain signal from the strain gauges 40, if the user retains the steering tube 22 in a status of pushing forward, the controller 50 will control the motor 32 to maintain a certain power output. Once the user applies a force of pulling backward to the steering tube 22, the controller 50 controls the motor 32 to decelerate based on another strain signal transmitted by the strain gauges 40. Furthermore, an additional set of regenerative brake system, which is a prior art technique and thus not repeatedly described hereunder, can be cooperated with the motor 32 for braking. That is, the electric energy generated by the motor 32 can be introduced into an external resistor (not shown) to increase the resistance force run by the motor 32, so as to achieve the effect of quick braking.

Figure 5:
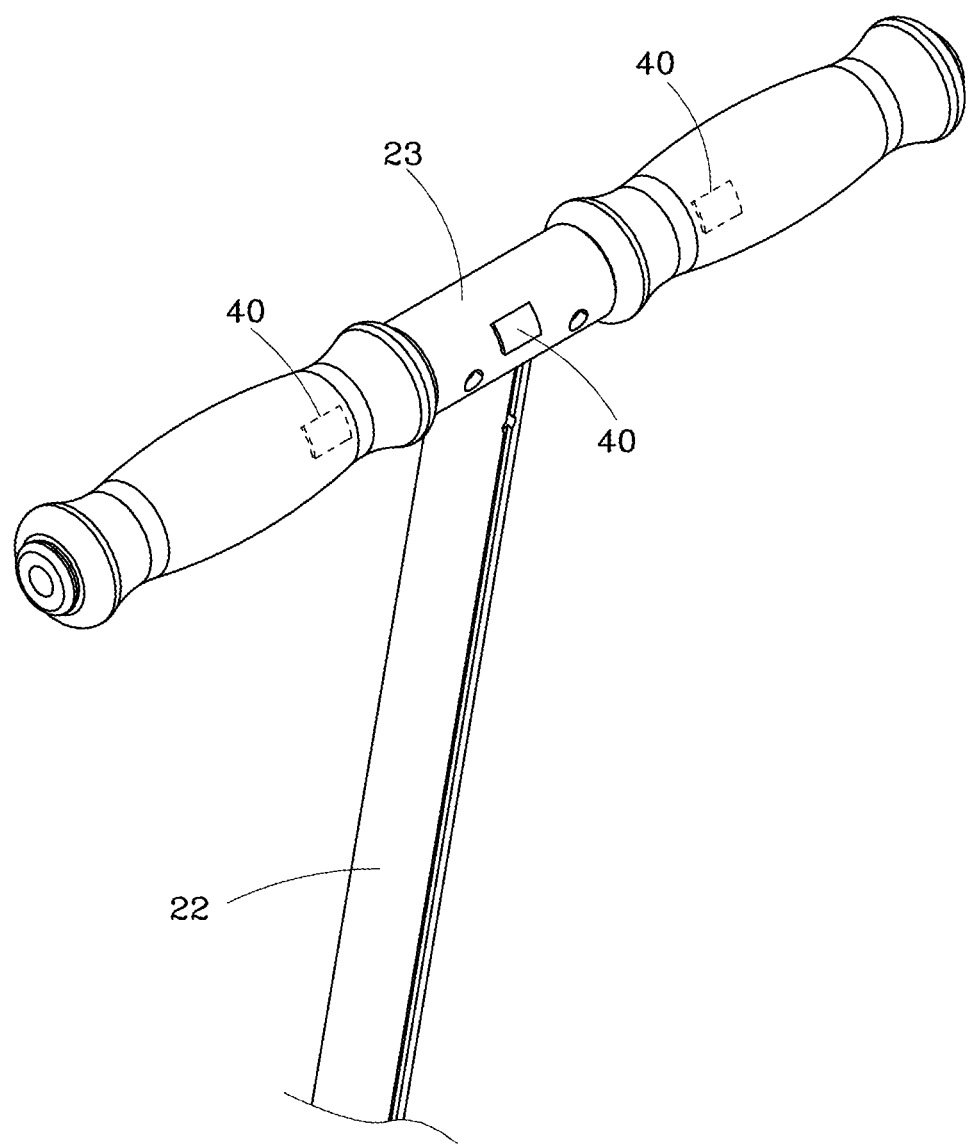
FIG. 5 is a partially perspective view of an electric kick scooter according to a second embodiment of the present invention, mainly illustrating that strain gauges are attached on a handle bar.
Figure 6:
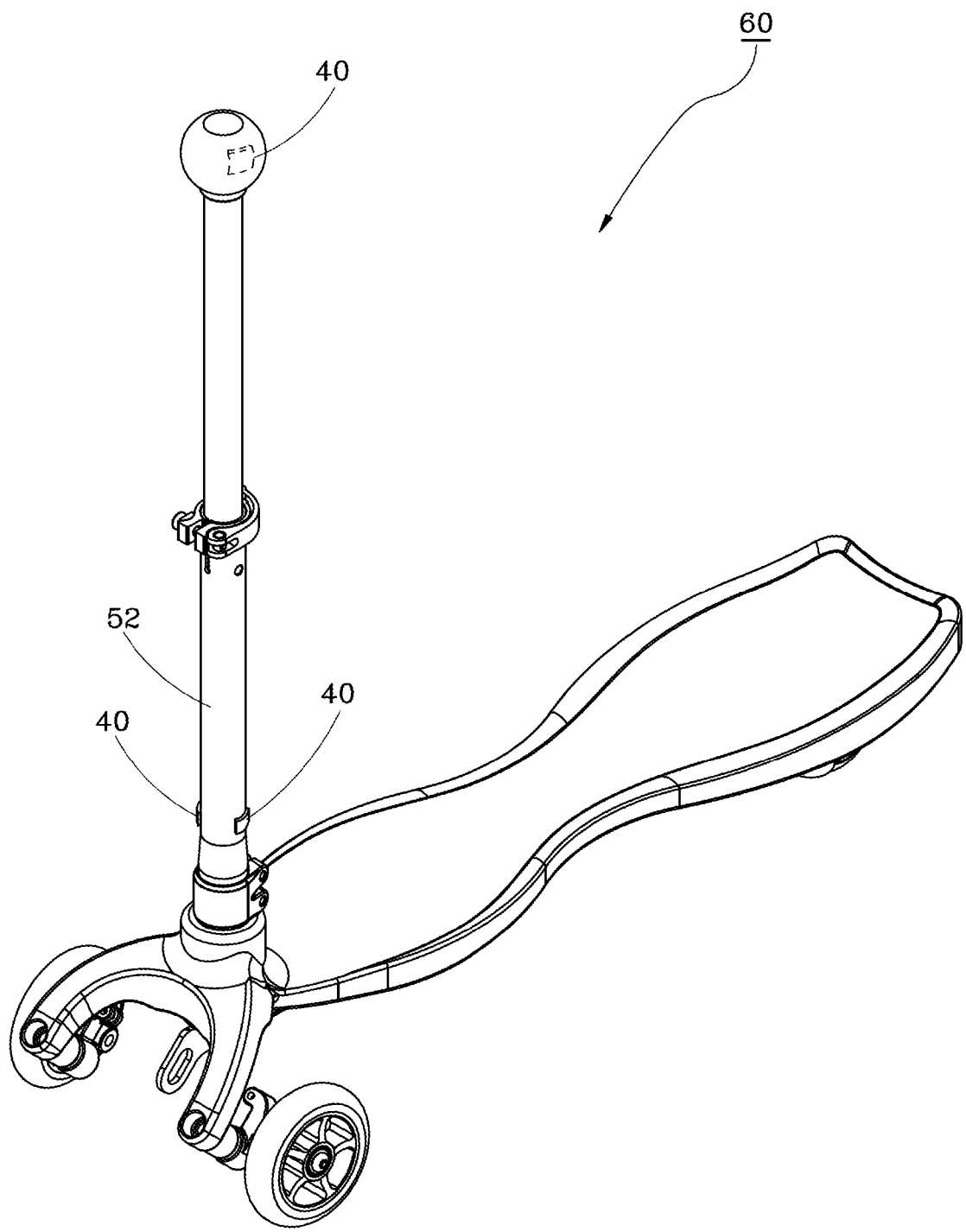
FIG. 6 is a perspective view of an electric kick scooter according to a third embodiment of the present invention.

On the other and, the positions of the strain gauges 40 to be attached to are not limited to the steering tube 22. For example, the strain gauges 40 can be attached at the center or both ends of the handle bar 23, as shown in FIG. 5, to sense the strain generated by the handle bar 23 when the handle bar 23 receives a pushing, pulling, twisting or grasping force. In addition, as shown in FIG. 6, the strain gauges 40 can be attached at different positions of a steering tube 52 based on different operating modes of an electric kick scooter 60. It is to be understood that the strain gauges 40 can be attached at a top end, left side or right side of the steering tube 52 to sense the strain generated by the steering tube 52 when the steering tube 52 receives twisting force or grasping force, so as to transmit a corresponding strain signal to the controller for enabling the controller to control accelerating, decelerating, stopping operation or braking of the motor 32. Of course, the strain gauges 40 are not necessarily provided with two sets simultaneously. At least one strain gauge 40 that is installed at the top end, left side or right side of the steering tube 52 shall be sufficient.

In summary, the electric kick scooter 10 of the present invention allows the user to manipulate the steering tube or handle bar by way of pushing forward, pulling backward, turning left or turning right by the design of attaching one or two sets of strain gauges to the steering tube or handle bar so as to synchronously control accelerating, decelerating, stopping operation or braking of the motor, thereby providing the convenience of operation in use and well safety of use so as to achieve the object of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electric kick scooter, comprising:
   a scooter body having a foot plate, a steering tube pivotally installed at a front end of the foot plate, a handle bar connected to a top end of the steering tube, a front wheel rotatably installed at a bottom end of the steering tube and a rear wheel rotatably installed at a rear end of the foot plate;
   a drive device having a motor installed in one of the front wheel and the rear wheel of the scooter body, and a battery installed with the scooter body and electrically connected to the motor;
   at least one strain gauge attached to one of the steering tube and the handle bar of the scooter body to sense the strain generated on the one of the steering tube and the handle bar when the one of the steering tube and the handle bar receives a force and then generate and transmit a strain signal; and
   a controller electrically connected with the motor, the battery and the at least one strain gauge to receive the strain signal from the at least one strain gauge and control an action of the motor based on the strain signal thus received,
   wherein the controller controls accelerating, decelerating, stopping operation or braking of the motor based on the strain signal,
   wherein when the strain signal generated by the strain gauge and received by the controller has a value less than a predetermined value, the controller does not control the action of the motor, and
   wherein the controller maintains the action of the motor when the controller does not receive another strain signal sensed by the at least one strain gauge.

2. The electric kick scooter according to claim 1, wherein the at least one strain gauge is attached to one of front and rear sides of the steering tube to sense the strain generated on the steering tube when the steering tube receives a pushing force, pulling force, twisting force or grasping force.

3. The electric kick scooter according to claim 1, comprising two said strain gauges oppositely attached to front and rear sides of the steering tube respectively to sense the strain generated on the steering tube when the steering tube receives a pushing force, pulling force, twisting force or grasping force.

4. The electric kick scooter according to claim 1, wherein the at least one strain gauge is attached to the handle bar to sense the strain generated on the handle bar when the handle bar receives a pushing force, pulling force, twisting force or grasping force.

5. The electric kick scooter according to claim 1, wherein the controller is installed inside the foot plate of the scooter body.

6. The electric kick scooter according to claim 1, wherein the motor is installed in the rear wheel.

7. The electric kick scooter according to claim 1, wherein the battery is installed on a bottom surface of the foot plate or inside the foot plate.

\* \* \* \* \*